US012767227B2

(12) United States Patent
Okazaki et al.

(10) Patent No.: US 12,767,227 B2
(45) Date of Patent: Oct. 20, 2026

(54) DRIVING ASSISTANCE DEVICE, DRIVING ASSISTANCE METHOD, AND PROGRAM

(71) Applicant: HONDA MOTOR CO., LTD., Tokyo (JP)

(72) Inventors: Yuta Okazaki, Tokyo (JP); Saki Shindo, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/871,161

(22) PCT Filed: Jun. 24, 2022

(86) PCT No.: PCT/JP2022/025358
§ 371 (c)(1),
(2) Date: Dec. 3, 2024

(87) PCT Pub. No.: WO2023/248472
PCT Pub. Date: Dec. 28, 2023

(65) Prior Publication Data

US 2025/0326436 A1 Oct. 23, 2025

(51) Int. Cl.
*B62D 15/02* (2006.01)

(52) U.S. Cl.
CPC .................................. *B62D 15/025* (2013.01)

(58) Field of Classification Search
CPC ............. B62D 15/0255; B62D 15/025; B60W 2540/20; B60W 30/12; B60W 30/18163; G06V 20/58; G06V 20/588; G08G 1/167
See application file for complete search history.

(56) References Cited

U.S. PATENT DOCUMENTS 7,893,819 B2 * 2/2011 Pfeiffer ................ B62D 15/029 340/435
2005/0273262 A1 * 12/2005 Kawakami ........... B62D 15/029 340/436
(Continued)

FOREIGN PATENT DOCUMENTS

JP 2005-346266 12/2005
JP 2008-012989 1/2008
(Continued)

OTHER PUBLICATIONS

International Search Report and Written Opinion for International Application No. PCT/JP2022/025358 mailed on Jul. 26, 2022, 11 pages.

*Primary Examiner* — Carl C Staubach
(74) *Attorney, Agent, or Firm* — Amin, Turocy & Watson, LLP

(57) ABSTRACT

A driving assistance device of an embodiment includes a recognizer configured to recognize surrounding conditions of a vehicle, a driving controller configured to execute lane keeping control for controlling at least steering of the vehicle so that the vehicle travels within a predetermined lane on the basis of a result of the recognition by the recognizer, and a receiver configured to receive an intention of a lane change of the vehicle according to an operation of an occupant of the vehicle, in which the driving controller stops the lane keeping control when the intention of the lane change is received by the receiver while the lane keeping control is executed, and resumes the lane keeping control at a timing before the lane change is completed.

11 Claims, 6 Drawing Sheets

(56) References Cited

U.S. PATENT DOCUMENTS

| | | | | |
|---|---|---|---|---|
| 2017/0240172 | A1* | 8/2017 | Nishiguchi | B60W 50/14 |
| 2019/0061811 | A1* | 2/2019 | Odate | B62D 5/0463 |
| 2019/0212749 | A1 | 7/2019 | Chen et al. | |
| 2021/0201600 | A1* | 7/2021 | Ghanbari | H04L 67/12 |

FOREIGN PATENT DOCUMENTS

| | | |
|---|---|---|
| JP | 2011-168194 | 9/2011 |
| JP | 2019-038421 | 3/2019 |
| JP | 2019-043379 | 3/2019 |
| JP | 2019-043432 | 3/2019 |
| JP | 6760204 | 9/2020 |
| JP | 2021-060819 | 4/2021 |
| WO | 2017/047261 | 3/2017 |

* cited by examiner

DRIVING ASSISTANCE DEVICE, DRIVING ASSISTANCE METHOD, AND PROGRAM

TECHNICAL FIELD

The present invention relates to a driving assistance device, a driving assistance method, and a program.

BACKGROUND ART

In recent years, there has been increased effort to provide access to sustainable transport systems that take into consideration vulnerable transport participants. To realize this, research and development to further improve the safety and convenience of traffic through research and development related to driving assistance technology has mainly been focused on. In relation to this, conventionally, technologies related to a vehicle lane keeping assistance system (LKAS) and lane change assistance control (LCA) have been disclosed (for example, refer to Patent Documents 1 to 5).

CITATION LIST

Patent Document

Patent Document 1: Japanese Unexamined Patent Application, First Publication No. 2011-168194

Patent Document 2: Japanese Unexamined Patent Application, First Publication No. 2019-43379

Patent Document 3: Japanese Unexamined Patent Application, First Publication No. 2019-43432

Patent Document 4: PCT International Publication No. WO2017/047261

Patent Document 5: Japanese Patent No. 6760204

SUMMARY OF INVENTION

Technical Problem

In the driving assistance technology, at a time of lane change according to manual driving, currently implemented LKAS control (hereinafter referred to as LKAS control) is interrupted, and the LKAS control is executed again after the lane change is completed. For this reason, a driver needs to drive manually from a start of the lane change until a start of the LKAS control, and there is a problem that a driving load in this section cannot be reduced in some cases.

To solve the problem described above, one of the objectives of the present application is to provide a driving assistance device, a driving assistance method, and a program that can provide more appropriate driving assistance at the time of changing lanes by manual driving. This will ultimately contribute to a development of a sustainable transportation system.

Solution to Problem

The driving assistance device, driving assistance method, and program according to the present invention have adopt the following configuration.

(1) A driving assistance device according to one aspect of the present invention includes a recognizer configured to recognize surrounding conditions of a vehicle, a driving controller configured to execute lane keeping control for controlling at least steering of the vehicle so that the vehicle travels within a predetermined lane on the basis of a result of the recognition by the recognizer, and a receiver configured to receive an intention of a lane change of the vehicle according to an operation of an occupant of the vehicle, in which the driving controller stops the lane keeping control when the intention of the lane change is received by the receiver while the lane keeping control is executed, and resumes the lane keeping control at a timing before the lane change is completed.

(2): In the aspect of (1) described above, a timing before the lane change is completed is a timing at which a predetermined position of the vehicle crosses a division line that divides a first lane in which the vehicle is traveling from a second lane to which the lane is to be changed and which is adjacent to the first lane, and enters the second lane.

(3): In the aspect of (2) described above, the predetermined position of the vehicle is a front wheel of the vehicle on a changing lane side, a center of the vehicle, or a center of gravity of the vehicle.

(4): In the aspect of (2) described above, the driving controller controls steering of the vehicle so that a center or a center of gravity of the vehicle travels in a center of the second lane when a predetermined position of the vehicle crosses the division line.

(5): In the aspect of (1) described above, the driving assistance device further includes a determiner configured to determine whether there is a possibility of contact with another vehicle present around the vehicle, in which the driving controller executes steering control to return the vehicle to the lane before the lane change without an operation of the occupant when the determiner determines that there is a possibility of contact with the other vehicle while the lane change is executed, and resumes the lane keeping control at a timing at which the steering control is completed.

(6): In the aspect of (1) described above, the driving assistance device further includes a determiner configured to determine whether there is a possibility of contact with another vehicle present around the vehicle, and an output controller configured to cause an output to output information to the occupant, in which the output controller causes the output to output information prompting the occupant to stop the lane change when the determiner determines that there is a possibility of contact with the other vehicle while the lane change is executed, and resumes the lane keeping control at a timing before the steering control for returning the vehicle to the lane before the lane change is completed by an operation of the occupant.

(7): In the aspect of (1) described above, the driving assistance device further includes a determiner configured to determine whether there is a possibility of contact with another vehicle present around the vehicle, in which, when the determiner determines that there is a possibility of contact with the other vehicle while the lane change is executed, the driving controller differentiates between timings of resuming the lane keeping control for first steering control for returning the vehicle to a lane before the lane change without an operation of the occupant and second steering control for returning the vehicle to a lane before the lane change according to an operation of the occupant.

(8): In the aspect of (7) described above, a timing of resuming the lane keeping control for execution of the second steering control is made earlier than when the first steering control is executed.

(9): In the aspect of (1) described above, the driving controller does not resume the lane keeping control for a lane to which the lane is to be changed when the recognizer is unable to recognize one of division lines of the lane to which the lane is to be changed.

(10): In the aspect of (9) described above, the driving controller resumes the lane keeping control for a lane to which the lane is to be changed when the recognizer is unable to recognize one of division lines of the lane to which the lane is to be changed and recognizes a traveling trajectory of a preceding vehicle or lane end information other than the division lines.

(11): A driving assistance method according to another aspect of the present invention includes, by a computer, recognizing surrounding conditions of a vehicle, executing lane keeping control for controlling at least steering of the vehicle so that the vehicle travels within a predetermined lane on the basis of a result of the recognition, receiving an intention to change the lane of the vehicle according to an operation of an occupant of the vehicle, stopping the lane keeping control when the intention to change the lane is received while the lane keeping control is executed, and resuming the lane keeping control at a timing before a timing at which the lane change is completed.

(12): A program according to still another aspect of the present invention causes a computer to execute recognizing surrounding conditions of a vehicle, executing lane keeping control for controlling at least steering of the vehicle so that the vehicle travels within a predetermined lane on the basis of a result of the recognition, receiving an intention to change the lane of the vehicle according to an operation of an occupant of the vehicle, stopping the lane keeping control when the intention to change the lane is received while the lane keeping control is executed, and resuming the lane keeping control at a timing before a timing at which the lane change is completed.

Advantageous Effects of Invention

According to the aspects of (1) to (12) described above, it is possible to perform more appropriate driving assistance at the time of changing lanes by manual driving.

DESCRIPTION OF EMBODIMENTS

Hereinafter, embodiments of a driving assistance device a driving assistance method, and a program of the present invention will be described with reference to the drawings.

Overall Configuration

Figure 1:
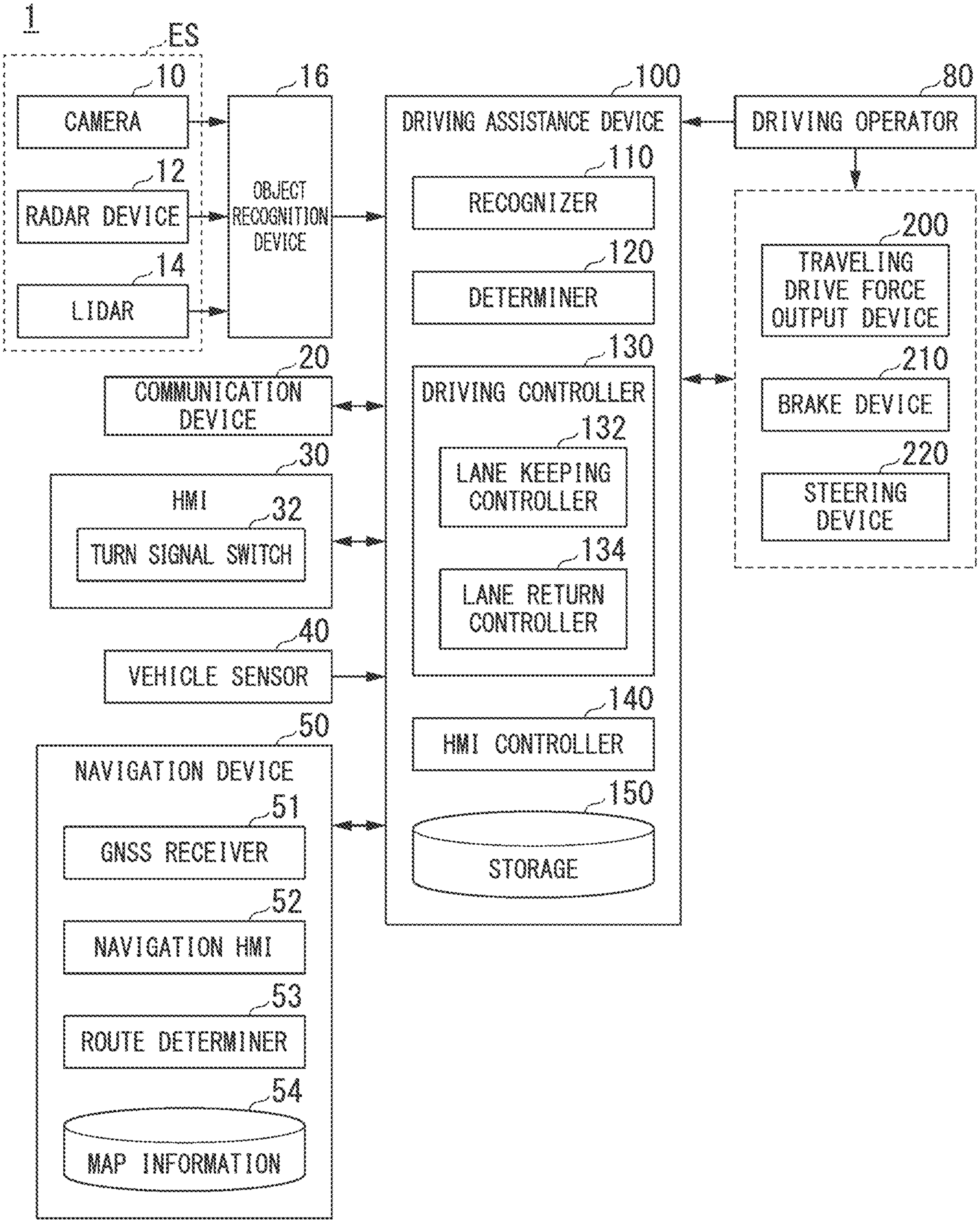
FIG. 1 is a configuration diagram of a vehicle system 1 using a driving assistance device according to an embodiment.

FIG. 1 is a configuration diagram of a vehicle system 1 using a driving assistance device according to an embodiment. A vehicle in which the vehicle system 1 is mounted (hereinafter, a host vehicle M) is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates by using electric power generated by a generator connected to the internal combustion engine or discharge power of secondary batteries or fuel cells. In the following description, it is assumed that the host vehicle M is a four-wheeled vehicle. In addition, in the following description, as an example, the driving assistance device may be applied to an automated driving vehicle. Automated driving is, for example, automatically controlling one or both of the steering and acceleration or deceleration of the host vehicle M to execute driving control. The driving control of the host vehicle M may include various driving assistance such as adaptive cruise control (ACC), LKAS, LCA, forward collision warning (FCW), and a collision mitigation braking system (CMBS). Driving of the automated driving vehicle may be partially or entirely controlled by manual driving of an occupant (a driver).

The vehicle system 1 includes, for example, a camera (an example of an imager) 10, a radar device 12, a light detection and ranging (LIDAR) 14, an object recognition device 16, a communication device 20, a human machine interface (HMI) 30, a vehicle sensor 40, a navigation device 50, a driving operator 80, a driving assistance device 100, a traveling drive force output device 200, a brake device 210, and a steering device 220. These devices and apparatuses are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added. A combination of the camera 10, the radar device 12, and the LIDAR 14 is an example of the "external sensor ES." The external sensor ES may include an object recognition device 16, or may include other detectors (for example, a sonar) that recognize surrounding conditions of the host vehicle M. The external sensor ES may also be a simple constituent such as a constituent of only the camera 10, or a constituent of only the camera 10 and the radar device 12. The HMI 30 is an example of an "output."

The camera 10 is a digital camera that uses a solid-state image sensor such as a charge coupled device (CCD) or a complementary metal oxide semiconductor (CMOS). The camera 10 is attached to an arbitrary place of a host vehicle M. For example, when an image of a front of the host vehicle M is captured, the camera 10 is attached to an upper part of a front windshield, a back surface of the windshield rearview mirror, and the like. In addition, when an image of a rear of the host vehicle M is captured, the camera 10 is attached to an upper part of a rear windshield, a back door, and the like. Moreover, when images of sides and rear sides of the host vehicle M are captured, the camera 10 is attached to a door mirror, and the like. The camera 10 periodically and repeatedly captures, for example, a periphery of the host vehicle M. The camera 10 may be a stereo camera.

The radar device 12 radiates radio waves such as millimeter waves to the periphery of the host vehicle M, and also detects at least a position (a distance and an orientation) of an object by detecting radio waves (reflected waves) reflected by the object. The radar device 12 is attached to an arbitrary place on the host vehicle M. The radar device 12 may detect the position and speed of an object in a frequency modulated continuous wave (FM-CW) method.

The LIDAR 14 irradiates the periphery of the host vehicle M with light (or electromagnetic waves with wavelengths close to that of light) and measures scattered light. The LIDAR 14 detects a distance to a target based on a time from light emission to light reception. The irradiated light is, for example, a pulsed laser beam. The LIDAR 14 is attached to an arbitrary place on the host vehicle M.

The object recognition device 16 performs sensor fusion processing on a result of detection obtained by some or all of constituents included in an external sensor ES, and recognizes the position, type, speed, and the like of an object. The object recognition device 16 outputs a result of recognition to the driving assistance device 100. The object recognition device 16 may output the results of detection obtained by the external sensor ES to the driving assistance device 100 as they are. The object recognition device 16 may be omitted from the vehicle system 1.

The communication device 20 communicates with other vehicles present in the periphery of the host vehicle M by using, for example, a cellular network, a Wi-Fi network, Bluetooth (a registered trademark), dedicated short range communication (DSRC), or the like, or communicates with various server devices via a wireless base station.

The HMI 30 presents various types of information to the occupant of the host vehicle M under control of the HMI controller 140 and receives an input operation from the occupant. The HMI 30 includes, for example, a display device, a speaker, a microphone, a buzzer, a touch panel, a key, and the like. In addition, the HMI 30 also includes, for example, a turn signal switch (a direction indicator) 32. The turn signal switch 32 is provided, for example, on a steering column or a steering wheel. The HMI 30 may also include, for example, a switch that receives whether to execute various driving assistance such as LKAS and ACC.

The vehicle sensor 40 includes a vehicle speed sensor that detects a speed of the host vehicle M, an acceleration sensor that detects acceleration, a yaw rate sensor that detects an angular speed around a vertical axis, an azimuth sensor that detects a direction of the host vehicle M, and the like. In addition, the vehicle sensor 40 may include a steering angle sensor that detects a steering angle of the host vehicle M (which may be an angle of a steering wheel or an operation angle of a steering wheel). The vehicle sensor 40 may include a position sensor that acquires a position of the host vehicle M. The position sensor is, for example, a sensor that acquires position information (longitude and latitude information) from a global positioning system (GPS) device. The position sensor may also be a sensor that acquires position information using a global navigation satellite system (GNSS) receiver 51 of the navigation device 50. The turn signal switch 32 and the vehicle sensor 40 are, for example, examples of a "receiver" that receives an intention to change a lane of the host vehicle according to an operation of the occupant of the host vehicle M.

The navigation device 50 includes, for example, a GNSS receiver 51, a navigation HMI 52, and a route determiner 53. The navigation device 50 holds map information 54 in a storage device such as a hard disk drive (HDD) or a flash memory. The GNSS receiver 51 identifies the position of the host vehicle M based on a signal received from a GNSS satellite. The position of the host vehicle M may be identified or complemented by an inertial navigation system (INS) using an output of the vehicle sensor 40. The navigation HMI 52 includes a display device, a speaker, a touch panel, a key, and the like. The navigation HMI 52 may be partially or entirely shared with the HMI 30 described above. The route determiner 53 determines, for example, a route from the position of the host vehicle M (or an arbitrary position to be input) identified by the GNSS receiver 51 to a destination to be input by the occupant using the navigation HMI 52 (hereinafter, a route on a map) with reference to the map information 54. The map information 54 is, for example, information in which a road shape is expressed by a link indicating a road and nodes connected by a link. The map information 54 may include a road curvature, point of interest (POI) information, and the like. In addition, the map information 54 may include, for example, information on a center of a lane, information on a boundary of a lane (a road division line), a width of a lane, and the like, and may also include road information, traffic regulation information, address information (an address and a postal code), facility information, telephone number information, and the like. The map information 54 may be updated at any time by the communication device 20 communicating with other devices. The map information 54 may be stored in a storage of the driving assistance device 100 described below.

The navigation device 50 may perform route guidance using the navigation HMI 52 based on the route on a map. The navigation device 50 may be realized by, for example, a function of a terminal device such as a smartphone or a tablet terminal owned by the occupant. The navigation device 50 may transmit a current position and a destination to a navigation server via the communication device 20 and acquire a route equivalent to the route on a map from the navigation server.

The driving operator 80 includes, for example, in addition to the steering wheel, an accelerator pedal, a brake pedal, a shift lever, and other operators. The driving operator 80 has a sensor that detects the amount of operation or a presence or absence of an operation attached thereto, and a result of detection is output to the driving assistance device 100, or some or all of the traveling drive force output device 200, the brake device 210, and the steering device 220. The steering wheel is an example of an "operator that receives a steering operation from a driver." The operator does not necessarily have to be circular, and may be in a form of a deformed steering wheel, a joystick, a button, or the like. In addition, the driving operator 80 outputs to the driving assistance device 100 a steering angle and a steering torque amount when an occupant (driver) of the host vehicle M steers the steering wheel in a predetermined direction.

The driving assistance device 100 includes, for example, a recognizer 110, a determiner 120, a driving controller 130, an HMI controller 140, and a storage 150. The recognizer 110, the determiner 120, the driving controller 130, and the HMI controller 140 are realized by, for example, a hardware processor such as a central processing unit (CPU) executing a program (software), respectively. In addition, some or all of these components may be realized by hardware (a circuit: including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the driving assistance device 100, or may be stored in a detachable storage medium such as a DVD or a CD-ROM and installed in the HDD or flash memory of the driving assistance device 100 by the storage medium (non-transitory storage medium) being attached to a drive device. The HMI controller 140 is an example of an "output controller."

The storage 150 may be realized by the various storage devices described above, or a solid-state drive (SSD), an electrically erasable programmable read only memory (EEPROM), a read only memory (ROM), a random access memory (RAM), or the like. The storage 150 stores, for example, a program and various types of information. In addition, the storage 150 may store, for example, map information 54.

The recognizer 110 recognizes the surrounding conditions of the host vehicle M on the basis of information input from the external sensor ES. For example, the recognizer 110 recognizes states of objects that are present within a predetermined distance from the host vehicle M, such as the position, speed, acceleration, and other conditions, on the basis of the information input from the external sensor ES. The objects are, for example, traffic participants such as other vehicles, bicycles, and pedestrians. The positions of the objects are, for example, recognized as positions on an absolute coordinate system with a representative point (such as a center of gravity or a center of the drive shaft) of the host vehicle M as an origin, and are used for control. The position of an object may be represented by a representative point such as the center of gravity or a corner of the object, or may be represented by an area. The “state” of the object may include an acceleration or jerk of the object, or a “behavior state” (for example, whether the object is changing lanes or is about to change lanes). The recognizer 110 may also recognize a type and the like of an object (another vehicle, bicycle, pedestrian) on the basis of characteristic information such as the size, shape, and color of the object.

In addition, the recognizer 110 recognizes, for example, a lane in which the host vehicle M is traveling (a traveling lane). For example, the recognizer 110 recognizes road division lines (hereinafter referred to as “division lines”) on the left and right of the host vehicle M based on a camera image captured by the camera 10, and recognizes the traveling lane on the basis of positions of the recognized division lines. The recognizer 110 may recognize the traveling lane by recognizing landmarks (traveling path boundaries, road boundaries) that can identify the position of a lane, including not only division lines but also road shoulders, curbs, medians, guard rails, fences, walls, and the like. In this recognition, the position of the host vehicle M acquired from the navigation device 50 and processing results by the INS may be taken into account.

The recognizer 110 may also recognize the traveling lane by referring to the map information 54 on the basis of the position information of the vehicle M obtained from the vehicle sensor 40, and may recognize the traveling lane by comparing a pattern of road division lines obtained from the map information 54 (for example, an arrangement of solid and dashed lines) with a pattern of road division lines around the host vehicle M recognized from the image captured by the camera 10. The recognizer 110 may also recognize a road shape of the traveling lane. Moreover, the recognizer 110 may recognize adjacent lanes adjacent to the traveling lane of the host vehicle M, stop lines, obstacles, red lights, toll booths, and other road phenomena.

In addition, when the recognizer 110 recognizes the traveling lane, the recognizer 110 recognizes the position and posture of the host vehicle M relative to the traveling lane. For example, the recognizer 110 may recognize a deviation of a reference point (a center or the center of gravity) of the host vehicle M from a center of the lane and an angle of the host vehicle M relative to a line connecting centers of the lane in a traveling direction of the host vehicle M as relative position and posture of the host vehicle M relative to the traveling lane. Alternatively, the recognizer 110 may recognize the position of the reference point of the host vehicle M relative to one of side edges (division lines or road boundaries) of the traveling lane as the relative position of the host vehicle M relative to the traveling lane.

Moreover, the recognizer 110 realizes, for example, a function based on artificial intelligence (AI) and a function based on a pre-given model in parallel. For example, a function of “recognizing an intersection” may be realized by executing in parallel recognition of an intersection by deep learning or the like and recognition based on pre-given conditions (such as signals and road signs that can be pattern matched), and by scoring and comprehensively evaluating both.

The determiner 120 determines whether the occupant (driver) of the host vehicle M intends to change the lane of the host vehicle M. In addition, instead of (or in addition to) the determination described above, the determiner 120 may determine whether the receiver has received an intention to change the lane of the host vehicle by the operation of the occupant of the vehicle. For example, when an operation of the turn signal switch 32 by the occupant is received and there is an adjacent lane in the direction indicated by the turn signal switch 32, the determiner 120 determines that the occupant intends to change the lanes of the host vehicle M. Furthermore, instead of (or in addition to) the operation of the turn signal switch 32, when a steering torque amount or yaw rate obtained from the vehicle sensor 40 according to a steering operation of a steering wheel by the occupant is equal to or greater than a threshold value and there is an adjacent lane in a steering direction of the steering wheel, the determiner 120 may determine that the occupant intends to change the lanes of the host vehicle M.

Moreover, when the recognizer 110 recognizes another vehicle in a vicinity (within a predetermined distance) of the host vehicle M, the determiner 120 may determine whether there is a possibility of contact between the host vehicle M and the other vehicle (whether there is a possibility of contact). For example, after determining that the occupant intends to change the lanes of the host vehicle M, the determiner 120 determines whether there is a possibility of contact between the host vehicle M and another vehicle traveling in a lane to which the lane of the host vehicle M is to be changed.

For example, the determiner 120 derives a time to collision (TTC) using a relative position (relative distance) and a relative speed between the host vehicle M and the other vehicle, and determines that there is a possibility of contact when the derived time to collision TTC is less than a threshold value, and determines that there is no possibility of contact when it is equal to or greater than the threshold value. The time to collision TTC is a value calculated by, for example, dividing the relative distance by the relative speed.

The driving controller 130 automatically controls one or both of steering and acceleration or deceleration of the host vehicle M on the basis of a result of the recognition by the recognizer 110 to execute driving control. For example, the driving controller 130 assists the occupant of the host vehicle M with a driving operation of the host vehicle M or in traveling the host vehicle M through driving control. Moreover, when an operation to execute at least one of various driving assistances is received by the HMI 30, the driving controller 130 executes driving control based on the received operation.

The driving controller 130 includes, for example, a lane keeping controller 132 and a lane return controller 134. When, for example, a switch operation to execute the LKAS control is received by the HMI 30, the lane keeping controller 132 executes lane keeping control for controlling at least the steering of the host vehicle M so that the host vehicle M travels within a predetermined lane, regardless of whether the driving operator 80 is operated by the occupant. The lane return controller 134 controls at least the steering of the host vehicle M so that it returns to a lane before a lane change when the determiner 120 determines that there is a possibility of contact with another vehicle while the host vehicle M is changing lanes. Details of the functions of the lane keeping controller 132 and the lane return controller 134 will be described below.

In addition, the driving controller 130 may also execute control such as ACC, LCA, FCW, and CMBS on the basis of a result of the recognition by the recognizer 110. For example, when an operation to execute ACC control is received by the HMI 30, the driving controller 130 executes driving control to make the host vehicle M follow a preceding vehicle. Moreover, when an operation to execute the LCA control is received by the HMI 30, the driving controller 130 sets a target position that will not come into contact with an object such as another vehicle in a center of a lane to which the lane is to be changed, which is present in a direction instructed by the turn signal switch 32, and notifies the occupant of the set target position from the HMI 30 to cause the occupant to perform the steering operation of the host vehicle M so that a center (or center of gravity) of the host vehicle M is positioned, or executes steering control. In addition, the driving controller 130 warns the occupant using the HMI 30 or performs control to cause an emergency stop of the host vehicle M through CMBS control when there is a possibility of contact with an object through FCW control. Some functions of the FCW control may be included in the lane return controller 134.

The HMI controller 140 notifies the occupant of predetermined information using the HMI 30, or acquires operation contents of the occupant operated through the HMI 30. The predetermined information includes, for example, information related to the traveling of the host vehicle M, such as information on a state of the host vehicle M and information on driving control. The information on the state of the host vehicle M includes, for example, information on a speed, an engine speed, a shift position, and the like of the host vehicle M. Moreover, the information on driving control may include, for example, information for prompting the driver to stop changing lanes, or information for inquiring whether to perform driving assistance. Furthermore, the predetermined information may include information that is not related to the traveling control of the host vehicle M, such as a television program, contents (for example, movies) stored in a storage medium such as a DVD.

For example, the HMI controller 140 may generate an image including the predetermined information described above and cause the display device 32 of the HMI 30 to display the generated image, or may generate a sound indicating the predetermined information and output the generated sound from the speaker of the HMI 30.

The traveling drive force output device 200 outputs a traveling drive force (torque) for the vehicle to travel to the drive wheels. The traveling drive force output device 200 includes, for example, a combination of an internal combustion engine, a motor, a transmission, and the like, and an electronic controller (ECU) that controls these. The ECU controls the configuration described above according to information input from the driving assistance device 100 or information input from the driving operator 80.

The brake device 210 includes, for example, a brake caliper, a cylinder that transmits a hydraulic pressure to the brake caliper, an electric motor that generates the hydraulic pressure in the cylinder, and a brake ECU. The brake ECU controls the electric motor according to the information input from the driving assistance device 100 or the information input from the driving operator 80 so that a brake torque according to a braking operation is output to each wheel. The brake device 210 may include a mechanism for transmitting a hydraulic pressure generated by an operation of a brake pedal included in the driving operator 80 to the cylinder via a master cylinder as a backup. The brake device 210 is not limited to the configuration described above, and may be an electronically controlled hydraulic brake device that controls an actuator according to the information input from the driving assistance device 100 to transmit the hydraulic pressure of the master cylinder to the cylinder.

The steering device 220 includes, for example, a steering ECU and an electric motor. The electric motor changes, for example, a direction of a steering wheel by applying a force to a rack and pinion mechanism. The steering ECU drives the electric motor according to the information input from the driving assistance device 100 or the information input from the driving operator 80, and changes the direction of the steering wheel. In addition, the steering device 220 may apply a torque reaction force by control of the driving assistance device 100 so as to rotate the steering wheel in a predetermined direction (or not to rotate the steering wheel in a predetermined direction) in response to a driving operation of the occupant.

Lane Keeping Control

Figure 2:
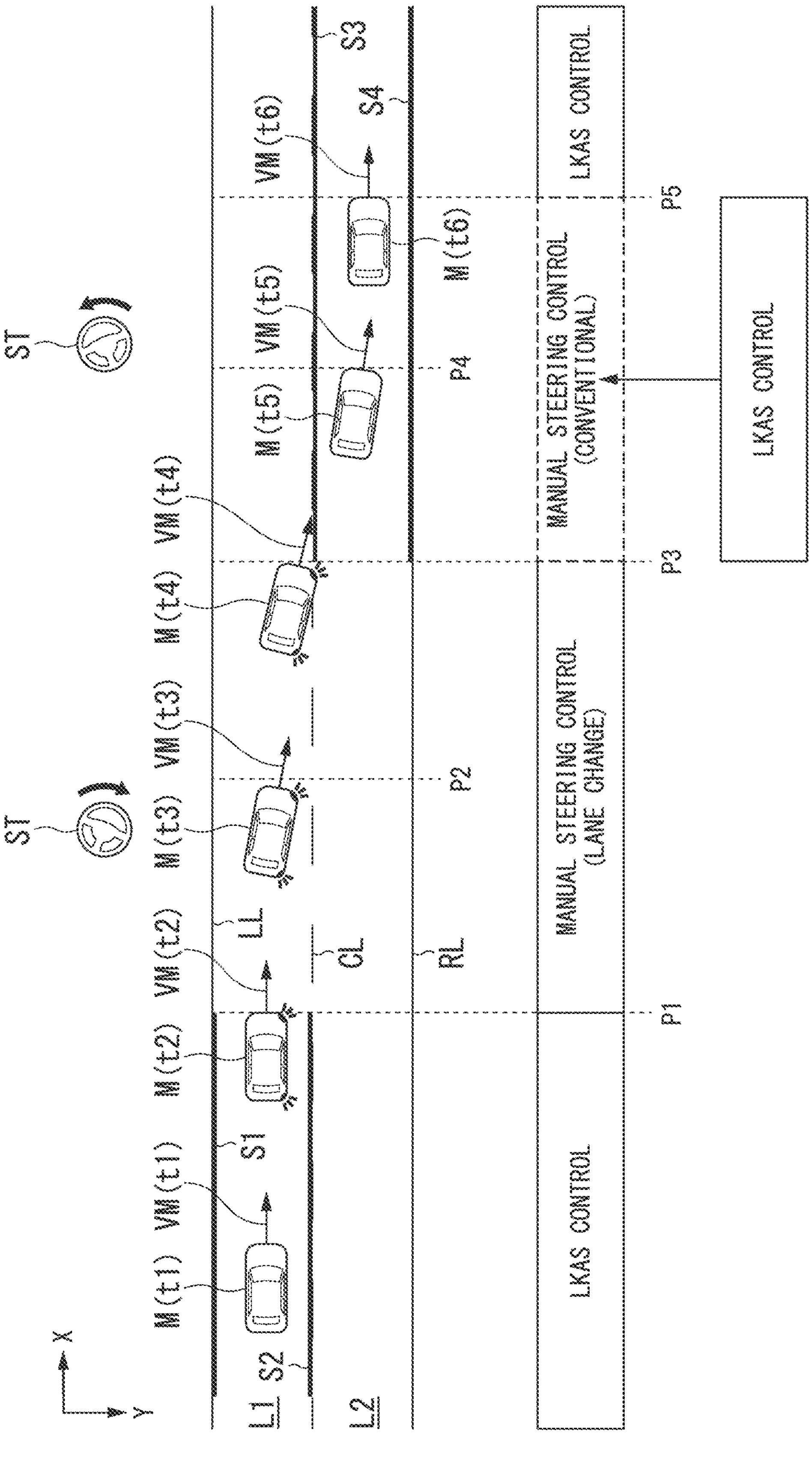
FIG. 2 is a diagram for describing a function of a lane keeping controller 132.

Next, details of the function of the lane keeping controller 132 will be described. FIG. 2 is a diagram for describing the function of the lane keeping controller 132. In the example of FIG. 2, two lanes L1 and L2 in which the host vehicle M can travel in the same direction (an X-axis direction in FIG. 2) are shown. The lane L1 is divided by division lines LL and CL, and the lane L2 is divided by division lines CL and RL. In the following description, the position and speed VM of the host vehicle M at a time t* are represented as M (t*) and VM (t*). In addition, it is assumed that a time t1 is the earliest, followed by t2, t3, t4, t5, and t6 in that order. Moreover, in the example of FIG. 2, a simplified steering direction of a steering wheel ST near a predetermined time (point) is shown. The control contents of the host vehicle M at each time will be described below.

In FIG. 2, at the time t1, the LKAS control is being executed by the lane keeping controller 132. In this case, the lane keeping controller 132 controls at least the steering among the steering and speed of the host vehicle M based on positions of the division lines LL and CL that divide the lane L1 recognized by the recognizer 110 so that the host vehicle M does not deviate from the lane L1 and, for example, the center (or the center of gravity) of the host vehicle M travels in a center (a center of a width) of the lane L1. Hereinafter, the steering control that is executed on the vehicle system 1 side without relying on the operation of the occupant (without a manual operation) is referred to as "first steering control." Lines S1 and S2 in FIG. 2 exemplarily show the division lines LL and CL recognized by the recognizer 110.

A time t2 is a timing at which the host vehicle M reaches a point P1 and indicates a timing at which an operation of the turn signal switch 32 (hereinafter referred to as "turn signal operation") by the occupant to turn on a right turn signal of the host vehicle M is received. The determiner 120 determines that the occupant intends to change the lane of the host vehicle M from the lane L1 to the lane L2 because an adjacent lane is recognized in a direction indicated by the turn signal operation. In this case, the lane keeping controller 132 temporarily stops the LKAS control that is being executed. In this case, the lane L1 is an example of a "first lane" and the lane L2 is an example of a "second lane."

Between the times t2 and t6, the occupant executes steering control to move the host vehicle M from the lane L1 to the lane L2, which is a target lane, by manual driving using the driving operator 80 (for example, a steering operation using the steering wheel). Hereinafter, the steering control executed in accordance with the driving operation of the occupant (by manual driving) is referred to as "second steering control."

Conventionally, lane change is determined to be completed at a timing at which the center of the host vehicle M is positioned in a center of the lane L2 after the lane change (a time t6 at which the host vehicle M reaches a point P5), and the LKAS control is executed to cause the host vehicle to travel within the lane L2 on the basis of the position of the division lines CL and RL that divide the lane L2 at this timing. However, in this case, the driver needs to drive from the time t2 (the point P1) to the time t6 (the point P5) at which the lane change is completed, so a driving burden cannot be reduced (especially the steering operation required for the occupant to align the left and right positions when the lane change is completed cannot be reduced). Therefore, in the present embodiment, the lane keeping control (LKAS control) is resumed (returned) at a timing before a timing at which the lane change is completed (the time t6, the point P5) according to a progress of the lane change.

Figure 3:
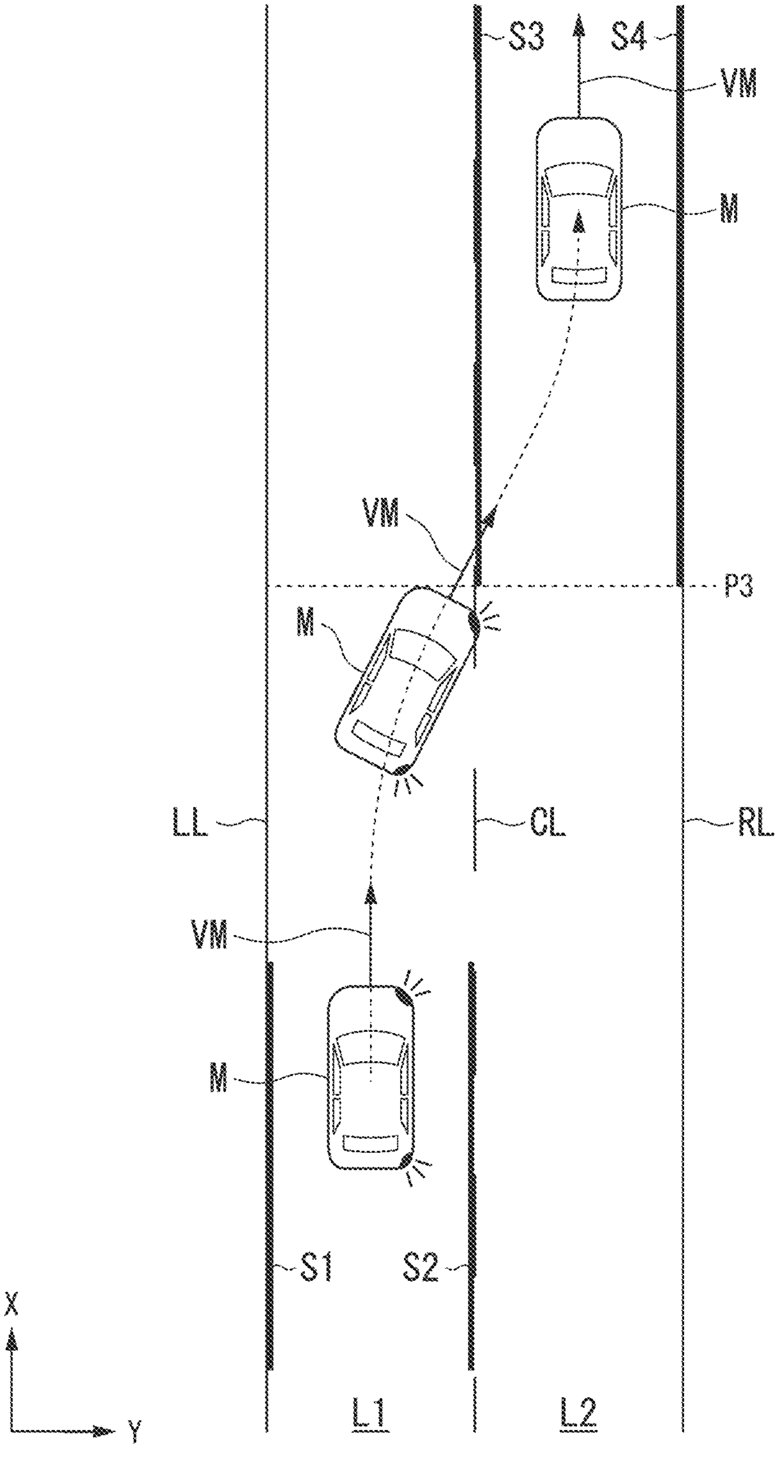
FIG. 3 is a diagram for describing a timing of resuming an LKAS control.

FIG. 3 is a diagram for describing a timing of resuming the LKAS control. FIG. 3 shows a case where the host vehicle M changes lanes from the lane L1 to the lane L2, as in FIG. 2. The lane keeping controller 132 resumes the LKAS control, which performs at least steering control so that the host vehicle M travels within the lane L2, on the basis of the position of the host vehicle M, steering information (a steering torque amount and a yaw rate), and positions of a result of the recognition (lines S3 and S4) of the division lines CL and RL of the lane L2 to which the lane is to be changed, recognized by the recognizer 110, at a timing before a timing at which the lane change from the lane L1 to the lane L2 is completed according to, for example, the steering operation of the occupant as shown in FIG. 3 (in other words, during execution of steering control to position the center of the host vehicle M in the center of the lane L2).

The timing before the timing at which the lane change is completed is, for example, a timing at which the predetermined position of the host vehicle M crosses the division line CL that divides the lane L1 in which the host vehicle M is traveling from the lane L2 and enters the lane L2. The predetermined position may be, for example, one of front wheels of the host vehicle M on a changing lane side (the lane L2 side), the center of the host vehicle M, or the center of gravity of the host vehicle M. The predetermined position may be changed depending on a shape of the host vehicle M, a vehicle type, a road shape, a width of the lane, and the like. For example, when the host vehicle M is a large vehicle such as a bus or truck, when the road shape is a curved road (with a curvature equal to or greater than a threshold value), or when the width is narrow (when the width is equal to or less than a predetermined width), the front wheel of the host vehicle M on the changing lane side may cross the division line CL and enter the lane L2, which is not intended by the occupant. In this case, by setting the predetermined position to the center of the host vehicle M, it is possible to more appropriately determine whether to resume the LKAS control.

When the predetermined position of the host vehicle M enters the lane L2, the lane keeping controller 132 executes steering control (first steering control) so that the center of the host vehicle M travels in the center of the lane L2 based on the result of recognition (lines S3 and S4) of the division lines of the lane L2 by the recognizer 110. In this manner, the LKAS control resumes at the timing at which the predetermined position of the host vehicle M crosses the division line CL and enters the lane L2, so that the LKAS control takes over part of the lane change of the host vehicle M, and steering adjustment in the vehicle width direction is performed by the LKAS control. Therefore, a driving section of the occupant is shortened (the times t2 to t4 (the points P1 to P3) shown in FIG. 2). In other words, the driver's steering operation for aligning the left and right positions as the lane change is completed can be reduced, so that the driving burden on the occupant can be reduced.

Lane Return Control

Next, details of a function of the lane return controller 134 will be described. When the recognizer 110 recognizes another vehicle approaching the host vehicle M in the lane L2, which is a lane to which the lane is to be changed, while a lane change is executed and the determiner 120 determines that there is a possibility of contact between the host vehicle M and the other vehicle, the lane return controller 134 performs steering control (lane return control) to return the host vehicle M from the lane L2 to an original lane (the lane L1) before the lane change.

Figure 4:
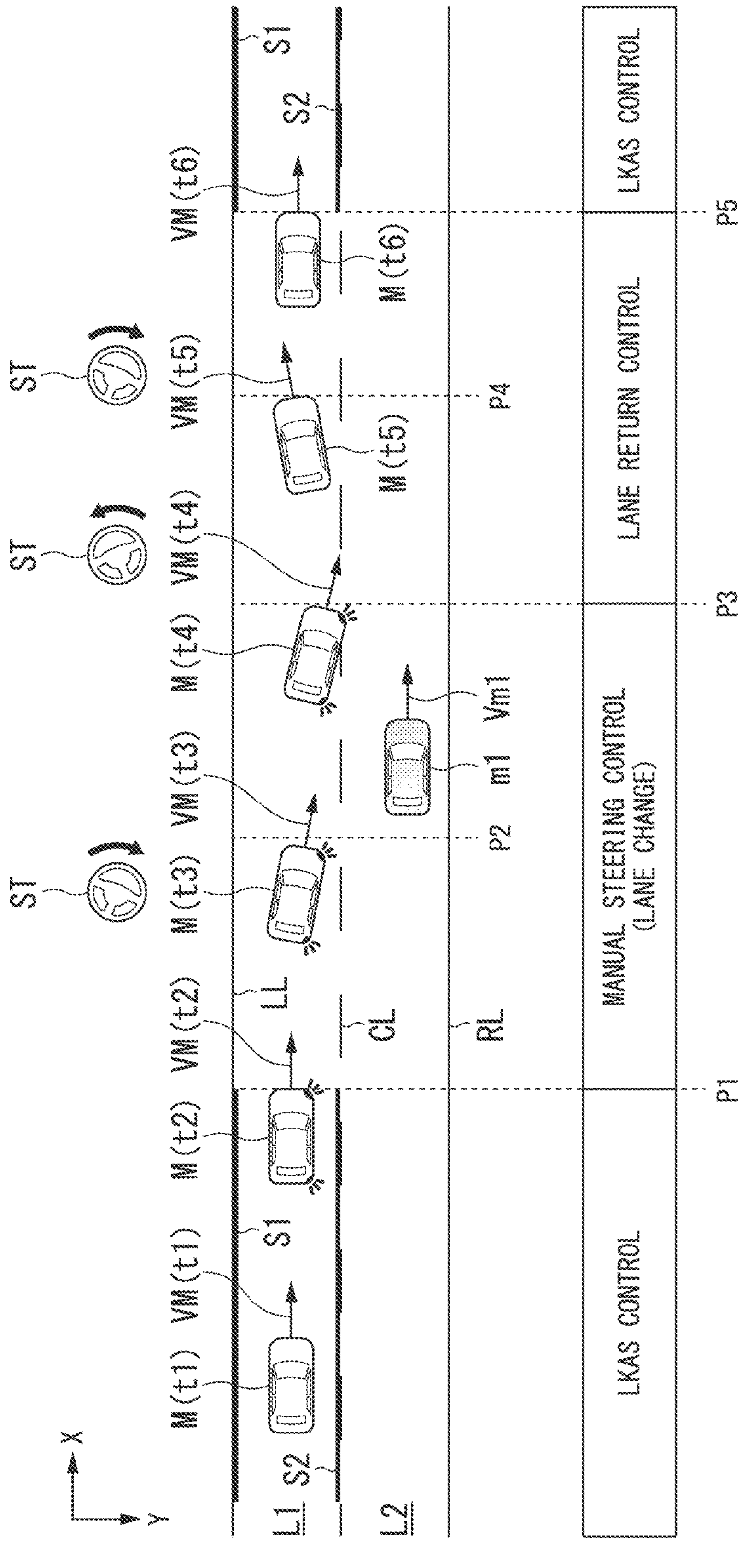
FIG. 4 is a diagram for describing a function of a lane return controller 134.

FIG. 4 is a diagram for describing the function of the lane return controller 134. In the example of FIG. 4, similar to FIG. 2, a scene in which the host vehicle M changes lanes from the lane L1 to the lane L2 is shown. In FIG. 4, it is assumed that another vehicle m1 is traveling in the lane L2 at a speed Vm1.

In the example of FIG. 4, at the time t2 (point P1), the determiner 120 determines that the driver intends to change lanes. The lane keeping controller 132 temporarily stops the LKAS control. Then, the lane change is executed by manual driving of the occupant.

Next, at a time t4 (a point P3), when the determiner 120 determines that there is a possibility of contact between the host vehicle M and the other vehicle m1, the lane return controller 134 executes lane return control to return the lane of the host vehicle to the lane L1 before the lane change. In addition, the lane return controller 134 may also notify the occupant by causing the HMI controller 140 to output from the HMI 30 information indicating that there is another vehicle that may come into contact with the host vehicle M and that the first operation control to return to the lane L1 will be executed.

After the time t4, the lane return controller 134 executes at least the steering control of the host vehicle M (first steering control) so that the center of the host vehicle M is positioned in the center of lane L1 on the basis of the position of the host vehicle M, the steering information (the steering torque amount and the yaw rate), and the result of recognition of the division lines LL and CL of the lane L1 before the lane change, recognized by the recognizer 110. The lane return controller 134 then completes the lane return control at the timing at which the center of the host vehicle M is positioned in the center of lane L1 (the timing at which the center of the host vehicle M reaches the time t6 (the point P5) in FIG. 4). After the time t6 at which the lane return control is completed, the lane keeping controller 132 resumes the LKAS control based on the result of recognition (the position of lines S1 and S2) of the division lines LL and CL.

In addition, instead of executing the lane return control by the first steering control, the lane return controller 134 may notify the occupant of information prompting the occupant to stop lane change, and have the occupant execute the second steering control. In this case, the lane keeping controller 132 may differentiate a timing at which the host vehicle M resumes the LKAS control for the first steering control from a timing at which it resumes the LKAS control for the second steering control.

Figure 5:
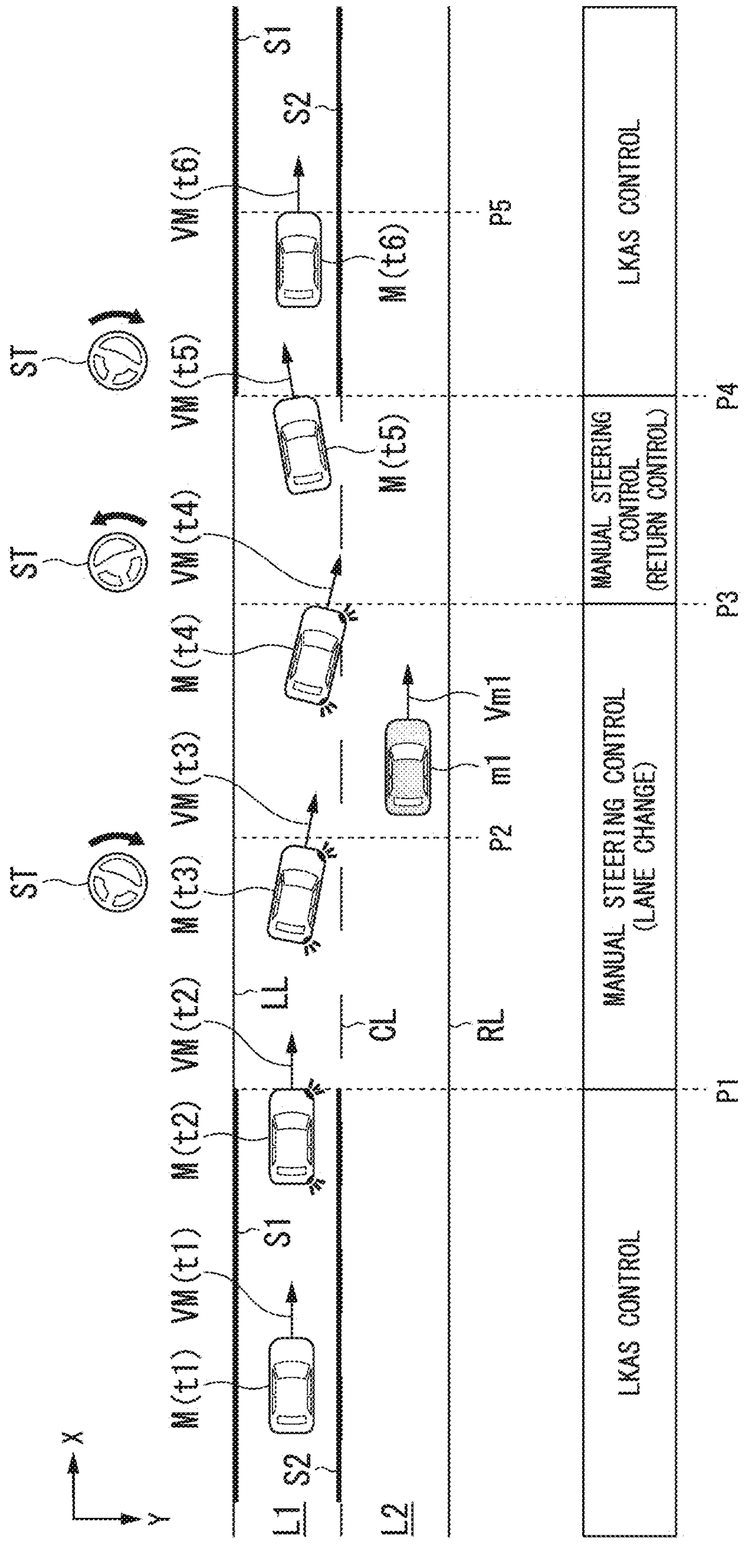
FIG. 5 is a diagram for describing a timing of resuming an LKAS control in lane return by second steering control.

FIG. 5 is a diagram for describing the timing of resuming the LKAS control in lane return by the second steering control. In the example of FIG. 5, processing after the time t4 is different from the example of FIG. 4. Therefore, in the following description, the processing after the time t4 will be mainly described. When the determiner 120 determines at the time t4 (the point P3) that there is a possibility of contact between the host vehicle M and the other vehicle m1, the lane return controller 134 uses the HMI controller 140 to cause information prompting the occupant to stop the lane change to be output from the HMI 30, and causes the occupant to execute the second steering control. In addition to (or instead of) the information prompting the occupant to stop the lane change, the lane return controller 134 may notify the occupant of information prompting a steering operation to return the host vehicle M to the lane L1 before the lane change, or information indicating that the host vehicle M is likely to contact another vehicle.

After the time t4, the lane keeping controller 132 resumes the LKAS control at a timing (for example, a timing at which the time t4 (or the point P4) shown in FIG. 5 is reached) before the timing at which the center of the host vehicle M is positioned in the center of the lane L1 by the second steering control (the timing at which lane return control is completed) according to the steering operation of the occupant. In other words, the lane keeping controller 132 makes the timing of resuming the LKAS control for execution of the second steering control earlier than when the first steering control is executed.

The timing for resuming the LKAS control in the second steering control may be, for example, the timing at which a steering torque amount (yaw rate) is generated to be equal to or greater than a threshold value in a direction opposite to the lane change side on the basis of the steering information, or the timing at which a predetermined position of the host vehicle M crosses the division line CL that divides the lanes L1 and L2.

As a result, it is possible to avoid contact between the host vehicle M and the other vehicle m1. In addition, even when the host vehicle M returns to the original lane by lane return control, LKAS control is resumed at an earlier timing in a case of the second steering control than in a case of the first steering control, so that part of the steering operation to return the host vehicle M to the lane L1 can be performed by the LKAS control, and the driving burden on the occupant can be reduced.

Modified Example

The lane keeping controller 132 may suppress the resuming of the LKAS control when only one of the division lines of a lane to which the lane is to be changed can be recognized. For example, when the recognizer 110 recognizes one (for example, the division line CL) of the division lines CL and RL of the lane L2 to which the lane is to be changed, but cannot recognize the other division line (for example, the division line RL), the lane keeping controller 132 suppresses early resuming of the LKAS control in the present embodiment (does not execute the LKAS control).

Note that even if the lane keeping controller 132 cannot recognize one of the division lines of a lane to which the lane is to be changed as described above, it may also resume the LKAS control when a traveling trajectory of a preceding vehicle or lane end information other than the division lines is recognized. The lane end information is, for example, information on walls, road shoulders, and the like.

Even if one of the division lines of a lane to which the lane is to be changed cannot be recognized as described above, the lane keeping controller 132 may execute the LKAS control so that the center (or the center of gravity) of the host vehicle M travels along a position where a distance from the division line CL is half a width of the lane L1 before the lane change on the basis of position information of the recognized division line CL and the width of the lane L1 before the lane change or width information of a standard lane specified in advance by regulations and the like. The width of the lane L1 may be acquired, for example, on the basis of a result of the detection by the external sensor ES, or may be acquired from the map information 54 by referring to the map information 54 on the basis of the current position of the host vehicle M. As a result, it is possible to resume the LKAS control even when one of the division lines of a lane to which the lane is to be changed cannot be recognized.

Processing Flow

Figure 6:
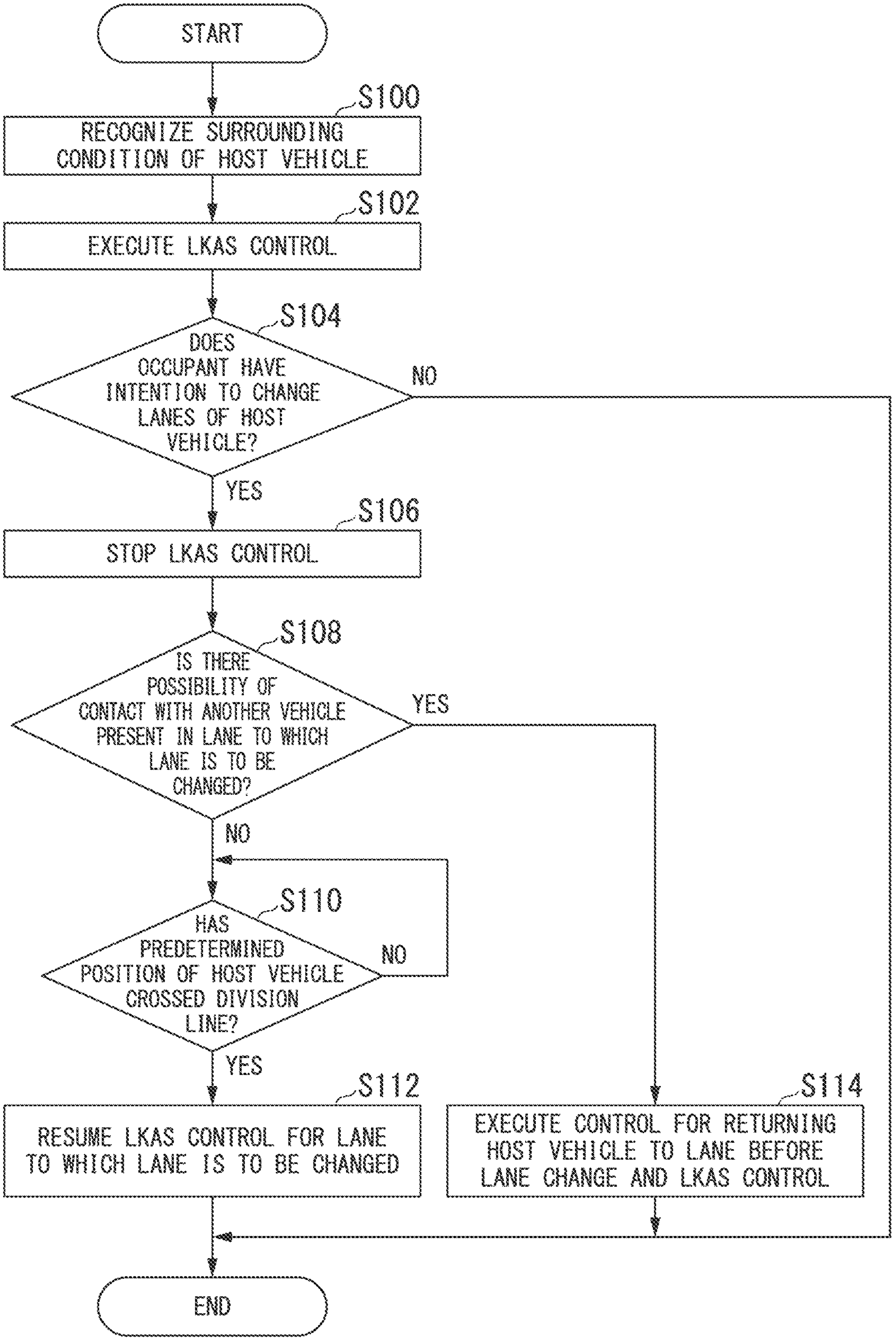
FIG. 6 is a flowchart which shows an example of a flow of processing executed by the driving assistance device 100 of the embodiment.

FIG. 6 is a flowchart which shows an example of a flow of processing executed by the driving assistance device 100 of the embodiment. In the processing of FIG. 6, the lane keeping control processing will be mainly described among various types of processing executed by the driving assistance device 100. In addition, the processing of FIG. 6 may be repeatedly executed at a predetermined cycle or timing. At a start of the processing of FIG. 6, it is assumed that an instruction to cause the host vehicle M to execute LKAS control has been received by the occupant via the HMI 30.

In the example of FIG. 6, the recognizer 110 recognizes the surrounding conditions of the host vehicle M (step S100). The processing of step S100 includes, for example, recognition processing of division lines and recognition processing of other vehicles. Next, the lane keeping controller 132 executes LKAS control on the basis of a result of the recognition by the recognizer 110 (step S102). Next, the determiner 120 determines whether the occupant intends to change a lane of the host vehicle M (step S104). When it is determined that the occupant intends to change the lane, the lane keeping controller 132 stops the ongoing LKAS control (step S106). As a result, it is possible to execute lane change by manual driving of the occupant.

Next, the lane keeping controller 132 determines whether there is a possibility of contact with another vehicle in a lane to which the lane is to be changed (step S108). When it is determined that there is no possibility of contact, the determiner 120 determines, for example, whether a predetermined position of the host vehicle M (for example, a front wheel on a lane change side) has crossed a division line that divides a traveling lane from adjacent lanes (step S110). When it is determined that the predetermined position has crossed the road division line, the lane keeping controller 132 resumes the LKAS control for the lane to which the traveling lane is to be changed (step S112).

In addition, when it is determined in the processing of step S108 that there is a possibility of contact with another vehicle in a lane to which the lane is to be changed, the lane keeping controller 132 executes the LKAS control at a timing based on control for returning to the lane before the lane change and control contents (first steering control or second steering control) (step S114). As a result, the processing of this flowchart will end. Moreover, when it is determined in the processing of step S104 that the occupant does not intend to change the lane of the host vehicle M, the LKAS control currently being executed is continued.

In the processing of step S110 in FIG. 6, the host vehicle M is in a standby state until the predetermined position crosses the division line. However, when it is not determined that the predetermined position of the host vehicle M has crossed the division line even after a predetermined time has elapsed since it was determined that the occupant intends to change the lane of the host vehicle M, the lane keeping controller 132 may resume the LKAS control for a current traveling lane. The predetermined time described above may be, for example, a fixed time, or may be a time based on a traveling distance or speed of the host vehicle M after it is determined that there is an intention to change lanes.

According to the embodiment described above, the driving assistance device 100 includes the recognizer 110 that recognizes the surrounding conditions of the host vehicle M, the driving controller 130 that executes lane keeping control for controlling at least the steering of the host vehicle M so that the host vehicle M travels within a predetermined lane on the basis of a result of the recognition by the recognizer 110, and the receiver (the turn signal switch 32 or the vehicle sensor 40) that receives an intention to change the lane of the host vehicle M according to the operation of the occupant of the host vehicle M. The driving controller 130 stops the lane keeping control when the receiver receives an intention to change the lane while the lane keeping control is being executed, and resumes the lane keeping control at a timing before the lane change is completed, thereby performing more appropriate driving assistance at a time of changing lanes by manual driving. This can ultimately contribute to development of a sustainable transportation system.

Specifically, according to the embodiment, when the predetermined position of the host vehicle M crosses a division line that divides the traveling lane from a target lane at the time of changing lanes by manual driving, the LKAS control is resumed, thereby maximizing a load reduction effect on the occupant. Furthermore, according to the embodiment, at the time of changing lanes by manual driving, a time until the LKAS control is automatically resumed can be shortened, so that it is possible to reduce inconvenience of the occupant (driver) during the lane change.

Furthermore, according to the present embodiment, even in lane return control to avoid contact with another vehicle, a timing of starting the LKAS control can be advanced. As described above, in the embodiment, a plurality of types of start timings are provided for the LKAS control, and the start timing can be switched depending on conditions such as the progress of the lane change, thereby realizing the LKAS control at an appropriate timing.

The embodiment described above can be expressed as follows.

A driving assistance device includes a storage medium for storing computer-readable instructions, and a processor that is connected to the storage medium, wherein the processor executes the computer-readable instructions to recognize surrounding conditions of the vehicle, execute lane keeping control for controlling at least the steering of the vehicle so that the vehicle travels within a predetermined lane on the basis of a result of the recognition, receive an intention to change a lane of the vehicle according to an operation of an occupant of the vehicle, stop the lane keeping control when the intention to change the lane is received while the lane keeping control is being executed, and resume the lane keeping control at a timing before a timing at which the lane change is completed.

Although a mode for carrying out the present invention has been described above using the embodiment, the present invention is not limited to the embodiment, and various modifications and substitutions can be made within a range not departing from the gist of the present invention.

REFERENCE SIGNS LIST

10 Camera
12 Radar device
14 LIDAR
16 Object recognition device
80 Driving operator
100 Driving assistance device
110 Recognizer
120 Determiner
130 Driving controller
132 Lane keeping controller
134 Lane return controller
140 HMI controller
150 Storage
200 Traveling drive force output device
210 Brake device
220 Steering device

What is claim is:

1. A driving assistance device comprising:
a recognizer configured to recognize surrounding conditions of a vehicle;
a driving controller configured to execute lane keeping control for controlling at least steering of the vehicle so that the vehicle travels within a predetermined lane on the basis of a result of the recognition by the recognizer; and
a receiver configured to receive an intention of a lane change of the vehicle according to an operation of an occupant of the vehicle,
wherein the driving controller stops the lane keeping control when the intention of the lane change is received by the receiver while the lane keeping control is executed, and resumes the lane keeping control at a timing before the lane change is completed,
further comprising:
a determiner configured to determine whether there is a possibility of contact with another vehicle present around the vehicle, and
an output controller configured to cause an output to output information to the occupant,
wherein the output controller causes the output to output information prompting the occupant to stop the lane change when the determiner determines that there is a possibility of contact with the other vehicle while the lane change is executed, and resumes the lane keeping control at a timing before the steering control for returning the vehicle to the lane before the lane change is completed by an operation of the occupant.

2. The driving assistance device according to claim 1,
wherein the timing before the lane change is completed is a timing at which a predetermined position of the vehicle crosses a division line that divides a first lane in which the vehicle is traveling from a second lane to which the lane is to be changed and which is adjacent to the first lane, and enters the second lane.

3. The driving assistance device according to claim 2, wherein the predetermined position of the vehicle is one of a front wheel of the vehicle on a changing lane side, or a center of a width of the vehicle, or a center of gravity of the vehicle.

4. The driving assistance device according to claim 2, wherein the driving controller controls steering of the vehicle so that a center or a center of gravity of the vehicle travels in a center of the second lane when a predetermined position of the vehicle crosses the division line.

5. The driving assistance device according to claim 1, wherein the driving controller executes steering control to return the vehicle to the lane before the lane change without an operation of the occupant when the determiner determines that there is a possibility of contact with the other vehicle while the lane change is executed, and resumes the lane keeping control at a timing at which the steering control is completed.

6. The driving assistance device according to claim 1, wherein the driving controller does not resume the lane keeping control for a lane to which the lane is to be changed when the recognizer is unable to recognize one of division lines of the lane to which the lane is to be changed.

7. The driving assistance device according to claim 6, wherein the driving controller resumes the lane keeping control for a lane to which the lane is to be changed when the recognizer is unable to recognize one of division lines of the lane to which the lane is to be changed and recognizes a traveling trajectory of a preceding vehicle or lane end information other than the division lines.

8. A driving assistance method comprising:
by a computer,
recognizing surrounding conditions of a vehicle;
executing lane keeping control for controlling at least steering of the vehicle so that the vehicle travels within a predetermined lane on the basis of a result of the recognition;
receiving an intention to change the lane of the vehicle according to an operation of an occupant of the vehicle;
stopping the lane keeping control when the intention to change the lane is received while the lane keeping control is executed;
resuming the lane keeping control at a timing before a timing at which the lane change is completed;
determining whether there is a possibility of contact with another vehicle present around the vehicle;
causing an output to output information to the occupant;
causing the output to output information prompting the occupant to stop the lane change when the determiner determines that there is a possibility of contact with the other vehicle while the lane change is executed; and
resuming the lane keeping control at a timing before the steering control for returning the vehicle to the lane before the lane change is completed by an operation of the occupant.

9. A computer-readable non-transitory storage medium storing a program for causing a computer to:
recognize surrounding conditions of a vehicle,
execute lane keeping control for controlling at least steering of the vehicle so that the vehicle travels within a predetermined lane on the basis of a result of the recognition,
receive an intention to change the lane of the vehicle according to an operation of an occupant of the vehicle,
stop the lane keeping control when the intention to change the lane is received while the lane keeping control is executed,
resume the lane keeping control at a timing before a timing at which the lane change is completed,
determine whether there is a possibility of contact with another vehicle present around the vehicle;
cause an output to output information to the occupant;
cause the output to output information prompting the occupant to stop the lane change when the determiner determines that there is a possibility of contact with the other vehicle while the lane change is executed, and
resume the lane keeping control at a timing before the steering control for returning the vehicle to the lane before the lane change is completed by an operation of the occupant.

10. A driving assistance device comprising:
a recognizer configured to recognize surrounding conditions of a vehicle;
a driving controller configured to execute lane keeping control for controlling at least steering of the vehicle so that the vehicle travels within a predetermined lane on the basis of a result of the recognition by the recognizer; and
a receiver configured to receive an intention of a lane change of the vehicle according to an operation of an occupant of the vehicle,
wherein the driving controller stops the lane keeping control when the intention of the lane change is received by the receiver while the lane keeping control is executed, and resumes the lane keeping control at a timing before the lane change is completed,
further comprising:
a determiner configured to determine whether there is a possibility of contact with another vehicle present around the vehicle,
wherein, when the determiner determines that there is a possibility of contact with the other vehicle while the lane change is executed, the driving controller differentiates between timings of resuming the lane keeping control for first steering control for returning the vehicle to a lane before the lane change without an operation of the occupant and second steering control for returning the vehicle to a lane before the lane change according to an operation of the occupant.

11. The driving assistance device according to claim 10, wherein a timing of resuming the lane keeping control for execution of the second steering control is made earlier than when the first steering control is executed.

* * * * *